(12) United States Patent
    Yue

(10) Patent No.: US 10,965,969 B2
(45) Date of Patent: Mar. 30, 2021

(54) METHOD AND APPARATUS FOR PLAYING ONLINE TELEVISION PROGRAM

(71) Applicant: SHENZHEN SKYWORTH-RGB ELECTRONIC CO., LTD., Guangdong (CN)

(72) Inventor: Shun Yue, Guangdong (CN)

(73) Assignee: SHENZHEN SKYWORTH-RGB ELECTRONIC CO., LTD., Guangdong (CN)

( * ) Notice: Subject to any disclaimer, the term of this patent is extended or adjusted under 35 U.S.C. 154(b) by 153 days.

(21) Appl. No.: 15/781,575

(22) PCT Filed: Nov. 1, 2016

(86) PCT No.: PCT/CN2016/104209
§ 371 (c)(1),
(2) Date: Jun. 5, 2018

(87) PCT Pub. No.: WO2017/219575
PCT Pub. Date: Dec. 28, 2017

(65) Prior Publication Data
US 2020/0267430 A1    Aug. 20, 2020

(30) Foreign Application Priority Data
Jun. 23, 2016 (CN) .......................... 201610463964.9

(51) Int. Cl.
*H04N 21/2343* (2011.01)
*H04N 21/234* (2011.01)
(Continued)

(52) U.S. Cl.
CPC . *H04N 21/234336* (2013.01); *H04N 21/2393* (2013.01); *H04N 21/23406* (2013.01);
(Continued)

(58) Field of Classification Search
None
See application file for complete search history.

(56) References Cited

U.S. PATENT DOCUMENTS 5,996,022 A * 11/1999 Krueger .................... G06F 8/65
                                                            709/247
8,896,765 B1 * 11/2014 White ................ H04N 21/4222
                                                            348/734
(Continued)

FOREIGN PATENT DOCUMENTS

CN    101300596 A    11/2008
CN    101420452 A    4/2009
(Continued)

OTHER PUBLICATIONS

Machine Translation acquired via Google Patents for CN103327392A-"processing method and system for video playing" (Year: 2013).*
(Continued)

*Primary Examiner* — Fernando Alcon
(74) *Attorney, Agent, or Firm* — Duane Morris LLP

(57) ABSTRACT

Provided are a method and an apparatus for playing an online television program. The method includes: a television obtaining a link address of a multimedia resource and determining whether having an online player capable of playing the multimedia resource; the television establishing a connection with a server based on a determination that the television does not have the online player capable of playing the multimedia resource; and the television sending the link of the multimedia resource to the server, such that the server transcodes the multimedia resource according to the link of the multimedia resource.

11 Claims, 6 Drawing Sheets

(51) Int. Cl.
*H04N 21/239* (2011.01)
*H04N 21/64* (2011.01)
*H04N 21/858* (2011.01)

(52) U.S. Cl.
CPC ..... *H04N 21/234363* (2013.01); *H04N 21/64* (2013.01); *H04N 21/858* (2013.01)

(56) References Cited

U.S. PATENT DOCUMENTS

| | | | |
|---|---|---|---|
| 9,258,625 B2* | 2/2016 | Martin | H04N 21/6582 |
| 2005/0091696 A1* | 4/2005 | Wolfe | H04N 21/2401 |
| | | | 725/116 |
| 2005/0114445 A1* | 5/2005 | Tracton | H04L 29/12047 |
| | | | 709/203 |
| 2006/0117379 A1* | 6/2006 | Bennett | H04N 21/2408 |
| | | | 726/3 |
| 2007/0061725 A1* | 3/2007 | Isaac | H04N 21/2393 |
| | | | 715/717 |
| 2008/0084504 A1* | 4/2008 | Nakamura | H04N 5/275 |
| | | | 348/590 |
| 2008/0195698 A1* | 8/2008 | Stefanovic | H04N 21/234309 |
| | | | 709/203 |
| 2009/0003436 A1* | 1/2009 | Levin | H04N 21/234309 |
| | | | 375/240.02 |
| 2009/0012985 A1* | 1/2009 | Matsubara | H04L 29/06027 |
| 2009/0100465 A1* | 4/2009 | Kulakowski | H04N 21/2355 |
| | | | 725/39 |
| 2010/0070608 A1* | 3/2010 | Hosur | H04N 21/85406 |
| | | | 709/218 |
| 2011/0150100 A1* | 6/2011 | Abadir | H04N 19/42 |
| | | | 375/240.26 |
| 2012/0271948 A1* | 10/2012 | Martin | H04N 21/2405 |
| | | | 709/226 |
| 2013/0124691 A1* | 5/2013 | Suryavanshi | H04L 51/10 |
| | | | 709/219 |
| 2014/0153909 A1 | 6/2014 | MacInnis et al. | |

FOREIGN PATENT DOCUMENTS

| | | | | |
|---|---|---|---|---|
| CN | 102339285 | A | 2/2012 | |
| CN | 103327392 | A | 9/2013 | |
| CN | 103338186 | A | 10/2013 | |
| CN | 103561279 | A | 2/2014 | |
| CN | 104104971 | A | 10/2014 | |
| CN | 104104972 | A | 10/2014 | |
| CN | 106101744 | A | 11/2016 | |
| WO | WO-2006126974 | A1 * | 11/2006 | H04N 19/156 |

OTHER PUBLICATIONS

First Office Action issued in connection with corresponding Chinese Patent Application No. 201610463964.9, 7 pages, dated Sep. 4, 2019.

International Search Report issued in connection with International patent application No. PCT/CN2016/104209, dated Feb. 8, 2017, 6 pages.

* cited by examiner

METHOD AND APPARATUS FOR PLAYING ONLINE TELEVISION PROGRAM

CROSS-REFERENCE TO RELATED APPLICATIONS

This application is a U.S. national stage application under 35 U.S.C. § 371 of International Application No. PCT/CN2016/104209, filed Nov. 1, 2016, which claims priority to Chinese Patent Application No. 201610463964.9, filed Jun. 23, 2016, the entireties of which are incorporated herein by reference.

TECHNICAL FIELD

The present disclosure relates to the technical field of televisions, and for example, relates to a method and an apparatus for playing an online television program.

BACKGROUND

Television industry belongs to the manufacturing industry. In order to limit the manufacturing cost, current televisions correspond to different product statuses, and their supports for multimedia formats are different as well. Low-cost and high-yield televisions support very few multimedia formats, and older televisions do not support new coder decoders. Different grades of televisions have different designs in chip performance, memory, Flash, and the like, which will certainly result in non-support for audio and video formats and limitations on a picture format. Meanwhile, for speed and storage space considerations, playing a multimedia resource by the television is based on decoding the multimedia resource by hardware. Therefore, there will inevitably be a case where the televisions support few video formats of multimedia and a resolution ratio and a code rate will be greatly limited.

SUMMARY

The present disclosure provides a method and an apparatus for playing an online television program, which can improve the adaptability of a television to a multimedia resource.

According to a first aspect, an embodiment of the present disclosure provides a method for playing an online television program. The method includes:

A television obtaining a link address of a multimedia resource and determining whether having an online player capable of playing the multimedia resource.

The television establishing a connection with a server based on a determination that the television does not have the online player capable of playing the multimedia resource.

The television sending the link of the multimedia resource to the server, such that the server transcodes the multimedia resource according to the link of the multimedia resource.

Alternatively, after the television establishing a connection with the server, the method further includes: sending identification information of the television to the server.

The identification information is configured to uniquely identify the television.

The sending identification information of the television to the server includes: in a case where the television establishes a connection with the server, sending a connection request containing the identification information to the server, such that the server acquires a performance record of the television in a pre-stored performance database when the server receives the connection request.

According to a second aspect, an embodiment of the present disclosure provides a method for playing an online television program. The method includes:

a server establishing a connection with a television; and
the server receiving a link of a multimedia resource sent by the television and transcoding, by the server, the multimedia resource according to the link of the multimedia resource.

Alternatively, after the server establishing a connection with the television, the method further includes: receiving identification information of the television by the server, wherein the receiving identification information of the television by the server includes:

when the server receives a connection request sent by the television, the server acquiring a performance record of the television in a pre-stored performance database;

when the server determines that the performance database already has the performance record of the television, the server returning a successful connection to the television; and when the server determines that the performance database has no performance record of the television, the server sending a request for acquiring a encoding and decoding performance of the television to the television, storing the acquired encoding and decoding performance in the performance database, and returning a connection success message to the television.

Alternatively, after the server receiving the link of the multimedia resource sent by the television, the method further includes:

querying a transcoding buffer pool by the server according to the link of the multimedia resource, and if the transcoding buffer pool has stored the link of the multimedia resource, sending by the server a playing link address corresponding to the link of the multimedia resource to the television.

Alternatively, the method further includes:

if the transcoding buffer pool has not stored the link of the multimedia resource, downloading and transcoding the multimedia resource by the server; and when the server downwards and transcodes the multimedia resource, the server analyzing the link of the multimedia resource, downloading the multimedia resource, and performing corresponding processes according to different resource contents.

Alternatively, the performing corresponding processes according to different resource contents by the server includes:

when the multimedia resource is an audio and video resource, downloading and decoding the audio and video resource by segments, and encoding by the server according to a multimedia format supported by the television that is read from the performance database;

when the multimedia resource is a picture and has a large size, scaling, by the server, the picture to a preset size supported by the television; and after the transcoding is completed, the server storing a corresponding result in the transcoding buffer pool and sending a playing link address corresponding to the link of the multimedia resource to the television;

such that after receiving the playing link address, the television invokes different players according to different video formats for playing.

Alternatively, the method further includes:

the server receiving operation information of a user on the multimedia resource and transcoding a corresponding resource segment according to the operation information; and the server sending a display effect of an online-edited multimedia resource to the television for previewing or superimposing the display effect with a background picture and then sending the display effect superimposed with the background picture to the television for previewing According to a third aspect, an embodiment of the present disclosure provides an apparatus for playing an online television program, which is configured on a television. The apparatus includes:

a determining module configured to obtain an address of a link of a multimedia resource and determine whether the television has an online player capable of playing the multimedia resource;

an establishing module configured to establish a connection with a server based on a determination that the television does not have the online player capable of playing the multimedia resource; and a first sending module configured to: in a case where the television establishes a connection with the server, send the link of the multimedia resource to the server, such that the server transcodes the multimedia resource according to the link of the multimedia resource.

Alternatively, the apparatus further includes:

a second sending module, which is configured to: after the television establishes a connection with the server, send identification information of the television to the server. The identification information is configured to uniquely identify the television.

The second sending module is configured to:

in a case where the television is connected to the server, send a connection request to the server, wherein the connection request comprises the identification information, such that when the server receives the connection request, the server acquires a performance record of the television in a pre-stored performance database.

According to a fourth aspect, an embodiment of the present disclosure provides an apparatus for playing an online television program, which is configured on a server. The server includes:

at least one processor, and a memory, which is in communication connection with the at least one processor.

The memory stores an instruction executable by the at least one processor, the instruction, when being executed by the at least one processor, causes the at least one processor to perform the server-side method for playing an online television program in any embodiment of the present disclosure.

Alternatively, the server is further configured to: receive identification information of the television after the television establishes a connection with the server.

The receiving identification information of the television by the server includes: when the server receives a connection request sent by the television, obtaining a performance record of the television in a pre-stored performance database; returning a connection success message to the television based on a determination that the performance record of the television is already in the pre-stored performance database; and sending a request for obtaining an encoding and decoding performance of the television to the television based on a determination that the performance record of the television is not in the pre-stored performance database; storing the obtained encoding and decoding performance in the performance database; and returning the connection success message to the television.

Alternatively, the server is further configured to: after the server receives the link of the multimedia resource sent by the television, query a transcoding buffer pool according to the link of the multimedia resource, and send a playing link address corresponding to the link of the multimedia resource to the television when the link of the multimedia resource is stored in the transcoding buffer pool.

Alternatively, the server is configured to: when the link of the multimedia resource is not stored in the transcoding buffer pool, download and transcode the multimedia resource.

When the server downwards and transcodes the multimedia resource, the server is configured to analyze the link of the multimedia resource, download the multimedia resource, and perform corresponding processes according to different resource contents Alternatively, the server is further configured to:

when the multimedia resource is an audio and video resource, download and decode the multimedia resource by segments, and encode the multimedia resource according to a multimedia format supported by the television that is read from the performance database;

when the multimedia resource is beyond a format supported by the television, select a preset format;

when the multimedia resource is a picture and has a large size, scale the size of the picture to a preset size supported by the television;

after the transcoding is completed, store a corresponding result in the transcoding buffer pool and send a playing link address corresponding to the link of the multimedia resource to the television, such that after the television receives the playing link address, the television invokes different players according to different video formats for playing.

Alternatively, the server is further configured to:

receive operation information of a user on the multimedia resource and transcode a resource segment corresponding to the operation information according to the operation information; and send a display effect of the multimedia resource that is online edited to the television for previewing, or superimpose a display effect and a background picture and send the display effect superimposed with the background picture to the television for previewing.

Embodiments of the present disclosure provide a method and an apparatus for playing an online television program. The television performs information interaction with the server. The television uploads its multimedia decoding performance to the server for the server to correspondingly transcode multimedia resource into a preset playing format of the television. The server obtains the multimedia resource, codes and decodes the multimedia resource, edits and synthesizes a picture, and caches the multimedia resource, thereby fully decoding the multimedia resource received by the television and ensuring that the resource can be normally played by the television. The adaptability of the television to the multimedia resource is improved and a better experience is obtained. The television support more network multimedia resources, so that the television can not only directly play uniform resource locator (url) addresses of individual Internet content providers or network disks, but also can play torrent resources or a Magnet links and the like.

BRIEF DESCRIPTION OF DRAWINGS

One or more embodiments are illustrated by way of figures in accompanying drawings corresponding to the one or more embodiments, which do not limit the embodiments. Elements having the same reference numerals in the accompanying drawings refer to like elements. Unless specifically stated, figures in the accompanying drawings do not constitute a scale limitation.

DETAILED DESCRIPTION

Embodiments of the present disclosure will be described below with reference to accompanying drawings and examples. It should be understood that specific embodiments described herein are merely used for explaining the embodiments of the present disclosure, rather than limiting the embodiments of the present disclosure. In addition, it is further to be noted that, for the convenience of description, only a part but not all of structures related to the embodiments of the present disclosure are shown in the accompanying drawings. In a case of no conflict, features in the embodiments may be arbitrarily combined with each other.

Figure 1:
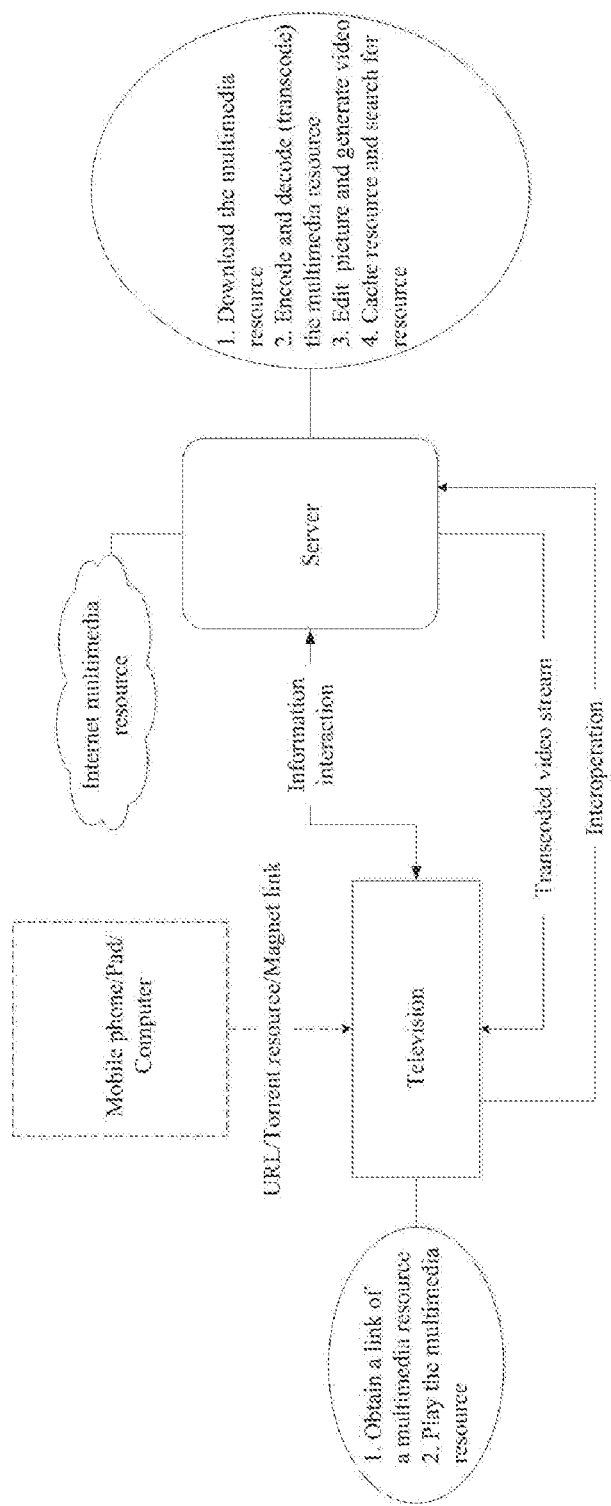
FIG. 1 is a diagram of a system architecture for playing an online television program according to an embodiment of the present disclosure.

With reference to FIG. 1, FIG. 1 is a diagram of a system architecture for playing an online television program according to an embodiment of the present disclosure.

As shown in FIG. 1, the television may obtain a multimedia resource for playing or a picture and an audio in a local USB storage device through the software of the television, and may obtain a multimedia resource with other devices (such as a mobile phone, a pad or a computer) through browsing a webpage, opening a network disk, an email attachment, a video site or a video forum and other ways. The multimedia resource may be a resource address which can be directly played, or may be a torrent or a Magnet link, and the like, and then the multimedia resource is pushed to the television. After obtaining the link address of the multimedia resource, the television analyzes whether the resource is supported by an online player of the television or not. If the resource is supported by the online player of the television, the multimedia resource is normally played; and if the resource is not supported by the online player of the television, the television is connected to a transcoding server.

Figure 2:
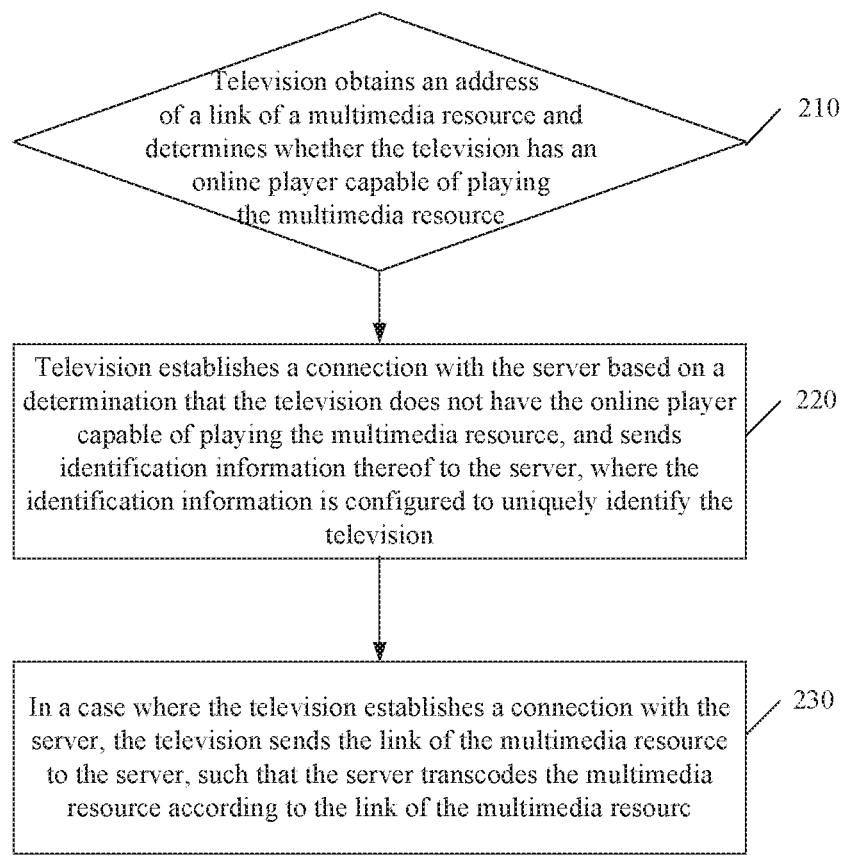
FIG. 2 is a schematic flowchart of a method for playing an online television program according to an embodiment of the present disclosure.

With reference to FIG. 2, FIG. 2 is a schematic flowchart of a method for playing an online television program according to an embodiment of the present disclosure. The method is applied to a television.

In FIG. 2, the method for playing an online television program includes the following steps.

In S210, a television obtains a link address of a multimedia resource and determines whether the television has an online player capable of playing the multimedia resource.

In S220, when it is determined that is the television does not have the online player capable of playing the multimedia resource, the television establishes a connection with a server.

In S230, in a case where the television establishes a connection with the server, the television sends the link of the multimedia resource to the server, such that the server transcodes the multimedia resource according to the link of the multimedia resource.

Alternatively, after the television establishes a connection with the server, the method further includes: sending identification information of the television to the server.

The identification information is used for uniquely identifying the television.

The step of sending identification information of the television to the server includes:

If the television establishes a connection with the server, the television sends a connection request containing the identification information to the server, such that when the server receives the connection request, the server obtains a performance record of the television in a pre-stored performance database.

Figure 3:
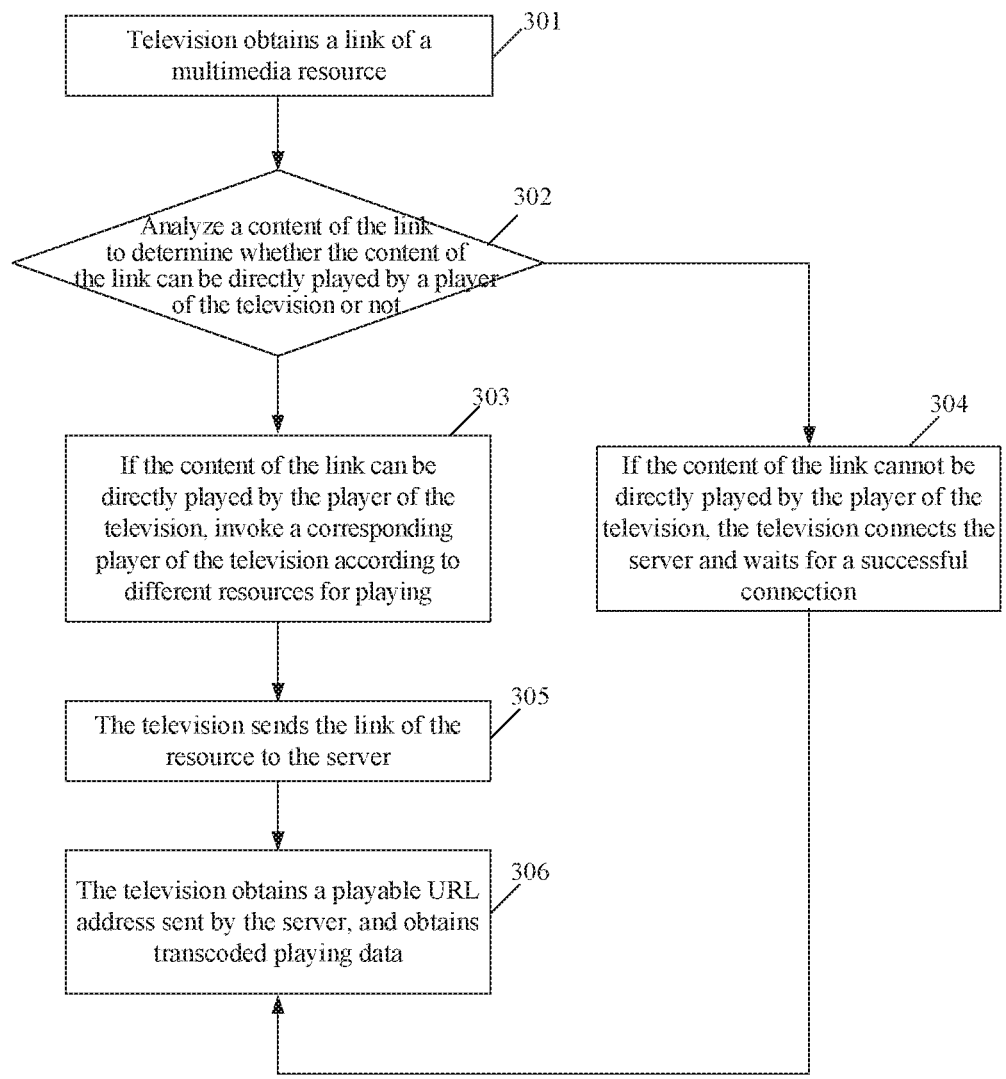
FIG. 3 is a schematic flowchart of another method for playing an online television program according to an embodiment of the present disclosure.

FIG. 3 is a schematic flowchart of another method for playing an online television program according to an embodiment of the present disclosure. The method is applied to a television. With reference to FIG. 3, in S301, the television obtains a link of multimedia resource.

In S302, the content of the link is analyzed to determine whether the multimedia resource can be directly played by a player of the television or not.

In S303, if the multimedia resource can be directly played by a player of the television, the multimedia resource is played by a corresponding player of the television according to different multimedia resources.

In S304, if the multimedia resource cannot be directly played by any player of the television, the television is connected with the server and waits for a successful connection.

In S305, the television sends the link of the multimedia resource to the server.

In S306, the television obtains a playable URL address sent by the server, and obtains the transcoded playing data.

An embodiment of the present disclosure provides a method for playing an online television program, which is applied to a server and includes the following steps.

A television establishes a connection with the server.

The server receives a link of a multimedia resource sent by the television and transcodes the multimedia resource according to the link of the multimedia resource.

Alternatively, after the television establishes a connection with the server, the method further includes: the server receives identification information of the television.

The receiving identification information of the television by the server includes the following steps.

When receiving the connection request sent by the television, the server obtains a performance record of the television in a pre-stored performance database. When the server determines that there is already a performance record of the television, a connection success message is returned to the television; and when the server determines that there is no performance record of the television, the server sends a request for obtaining an encoding and decoding capability of the television to the television, stores the obtained encoding and decoding capability in the performance database, and returns a connection success message to the television.

Alternatively, after the server receives the link of the multimedia resource sent by the television, the method further includes:

The server queries a transcoding buffer pool according to the link of the multimedia resource, and when the transcoding buffer pool has stored the link, the server sends a playing link address corresponding to the link of the multimedia resource to the television.

Alternatively, the method further includes:

when the transcoding buffer pool has not stored the link, the server downloads and transcodes the multimedia resource; and when the server downwards and transcodes the multimedia resource, the server analyzes the link of the multimedia resource, downloads the multimedia resource, and then performs corresponding processing according to different resource contents.

Alternatively, the performing corresponding processing according to different resource contents by the server includes:

When the multimedia resource is an audio and video resource, the multimedia resource needs to be downloaded and decoded by segments, and the server performs encoding according to the multimedia format supported by the television in the performance database.

When the multimedia resource is beyond a format supported by the television, the server selects a preset format. The preset format may be a television-supported and commonly-used format.

When the multimedia resource is a picture and has a large size, the server scales the size of the picture to a preset size supported by the television. The preset size may be a mostly suitable size allowing the picture to be played by the television.

After the transcoding is completed, the server stores the corresponding result in the transcoding buffer pool and sends the playing link address corresponding to the link of the multimedia resource to the television.

After the television receives the playing link address, the television invokes different players according to different video formats for playing.

Figure 4:
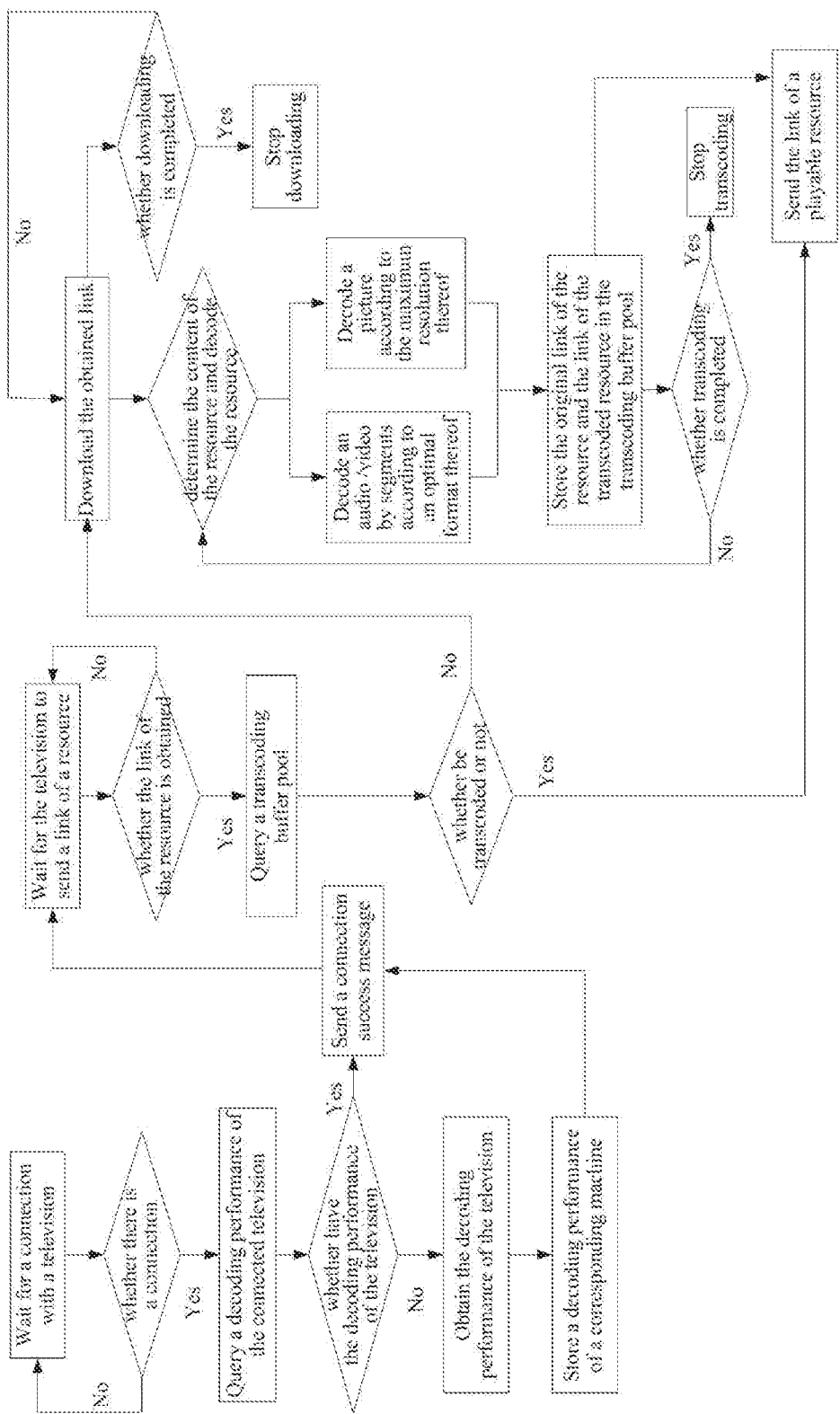
FIG. 4 is a schematic flowchart of another method for playing an online television program according to an embodiment of the present disclosure.

With reference to FIG. 4, when the television is connected with a server, the television needs to send its chip and model information, which is a keyword uniquely identifying the encoding and decoding performance of the television. When the server receives a connection request from the television, the server may check the performance database to determine whether there is already the link or not. If there is already the link, the found transcoded playing link address is directly sent to the television. If the link is not in the performance database, the server downloads and transcodes the resource. When the server performs transcoding, the server needs to analyze the link of the resource, then downloads the resource, and then performs a corresponding process according different resource contents. If the multimedia resource is an audio and video resource, the multimedia resource needs to be downloaded and decoded by segments and be encoded according to the multimedia format supported by the television read from the performance database. If the multimedia resource is beyond formats supported by the television, a preset format is selected. If the multimedia resource is of a picture format, there are two situations. One situation is that the picture is too large and needs to be scaled to a preset size supported by the television. The other situation is that the multimedia resource is of a format which is not supported by the television, and the format needs to be converted into a format supported by the television. After the transcoding is completed, the corresponding result is stored in a transcoding buffer pool, and a playable link address is generated and sent to the television. When the television receives the playable link address, the television invokes a corresponding player according to the video format for playing it.

For example, a basic structure of the performance database includes chip and model serial numbers, a supported video format, a supported audio format, and a supported picture format.

The chip and model information includes a serial number, a chip 8S79 and a model 43G6.

The supported video format includes a serial number, an encoding format MPEG1/2, the maximum resolution 1080P@30 fps, a code rate 40 Mbps, and a specification MP@HL and is packaged as:
MPEG program stream
(.DAT, .VOB, .MPG, .MPEG)
MPEG transport stream
(.ts, .trp, .tp)
MP4 (.mp4, .mov)
3GPP (0.3gpp, 0.3gp)
AVI (.avi)
MKV (.mkv)

The supported audio format includes a serial number, an encoding format FLAC, a sampling rate 8 KHz to 96 KHz, a channel Up to 5.1, a code rate <1.6 Mbps and a packaging format Matroska (.mkv, .mka).

The picture format includes a serial number, an encoding format JPEG, a Base-line, a Progressive and the maximum resolution ratio 15360×8640, 7000×7000.

The transcoding buffer pool includes a serial number, a resource link Http://srt.skyworth.com/test.mp4, and transcoded resource lists Http://172.20.5.238/test0.mp4 and Http://172.20.5.238/test1.mp4.

Embodiments of the present disclosure provide a method for playing a television program online. The television and the server perform information interaction with each other. The television uploads its multimedia decoding performance to the server for the server to correspondingly transcode multimedia resource into a preset playing format of the television. The server obtains the multimedia resource, codes and decodes the multimedia resource, edits and synthesizes a picture, and caches the multimedia resource, thereby fully decoding the multimedia resource received by the television and ensuring that the resource can be normally played by the television. The adaptability of the television to the multimedia resource is improved and a better experience is obtained. The television support more network multimedia resources, so that the television can not only directly play url addresses of individual Internet content providers or network disks, but also can play torrent resources or a Magnet links and the like.

Alternatively, the method further includes:

The server receives a user's operation information on the multimedia resource and transcodes the corresponding resource segment according to the operation information; and The server sends a display effect of an online-edited multimedia resource to the television for previewing, or the display effect is superimposed with the background picture and then is sent to the television for previewing.

After the multimedia resource is played, the user may perform operations such as fast forward and fast rewind on the audio and video. In this case, the time point corresponding to the fast forward or fast rewind is sent to the server; and the server transcodes the resource segments required by the user, and the other parts of the audio and video are also downloaded and transcoded, since other machines may need this resource. The operation of the server on the picture is more complex, and online editing of the picture is supported, which can beautify the picture. The server sends the display effect picture to the television for previewing. The server may add a background picture to the picture. The display effect picture is superimposed with the background picture and then sent to the television for previewing. The server may also send different background pictures to the television, and the television moves the picture to superimpose the picture and the background image. Alternatively, a switching effect superimposing is performed with a browsed and edited picture to generate a video, which is more convenient for users to watch.

Figure 5:
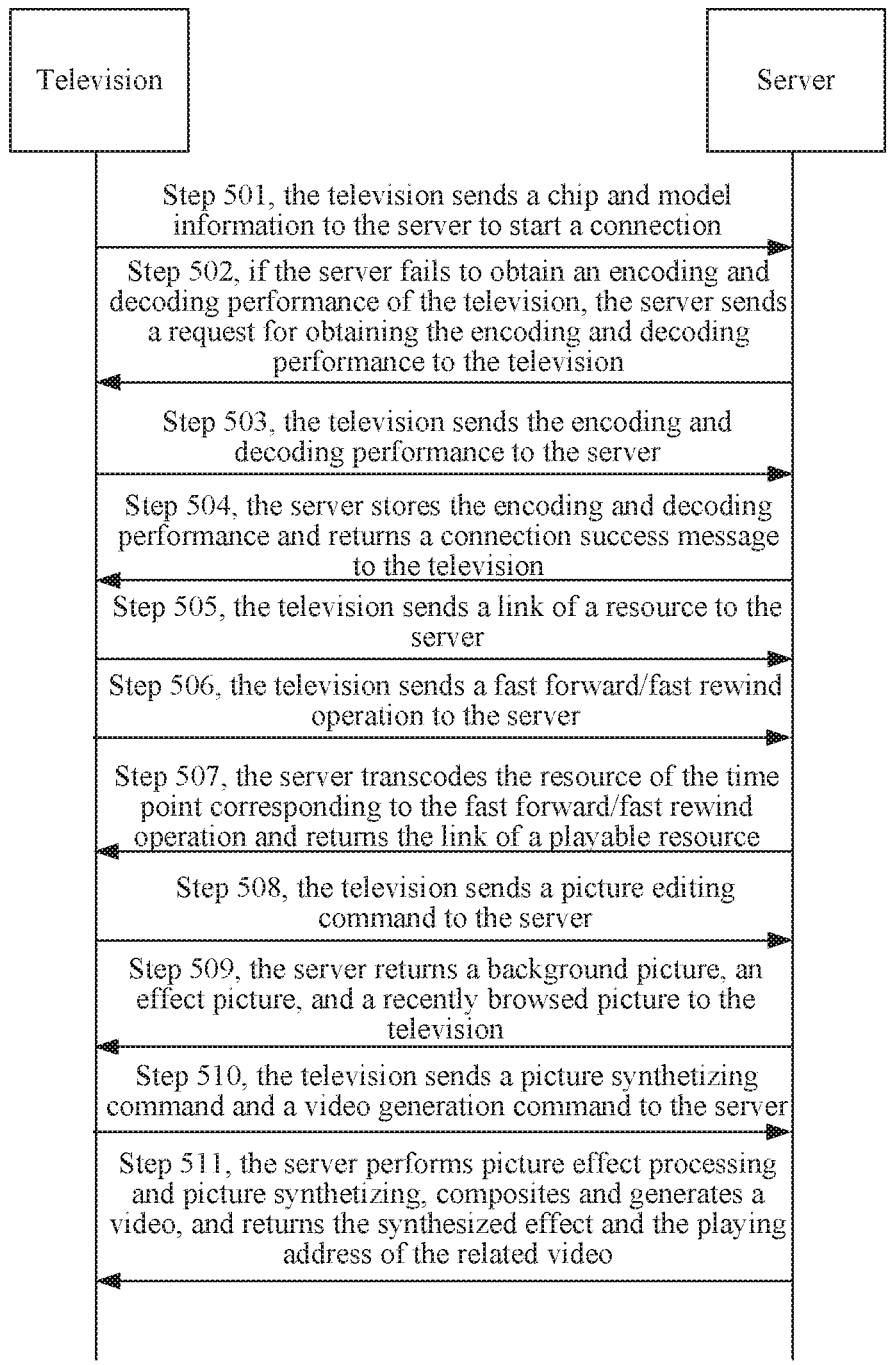
FIG. 5 is a schematic diagram showing an interaction in playing an online television program according to an embodiment of the present disclosure.

Particularly, with reference to FIG. 5, FIG. 5 is a schematic diagram showing an interaction in playing an online television program according to an embodiment of the present application.

As shown in FIG. 5, in S501, a television sends a chip and model information to a server for starting a connection.

In S502, when the server fails to acquire an encoding and decoding performance of the television, the server sends a request for obtaining the encoding and decoding performance to the television.

In S503, the television sends the encoding and decoding performance to the server.

In S504, the server stores the encoding and decoding performance, and returns a connection success message to the television.

In S505, the television sends a link of a resource to the server, such that the server performs a transcoding operation.

In S506, the television sends a fast forward/fast rewind operation to the server.

In S507, the server transcodes the resource of the time point corresponding to the fast forward/fast rewind operation and returns a link of a playing resource.

In S508, the television sends a picture editing command to the server.

In S509, the server returns a background picture, an effect picture, and a recently browsed picture to the television.

In S510, the television sends a picture synthesizing and video generation command to the server.

In S511, the server performs a picture effect processing and picture synthesizing, to generate a video, and returns the synthesized effect and the corresponding video playing address.

An embodiment of the present disclosure provides a method for playing an online television program. The television performs operations (fast forward, fast rewind, etc.) on audio and video playing, edits the picture and synthesizes multiple groups of pictures, and sends these operations to the server; and the server processes the multimedia resource, and finally the display effect is sent to the television. A picture resource is edited online and beautified with the television, or multiple pictures may be synthesized to generate a video, thereby bringing a better picture enjoyment to the user.

Figure 6:
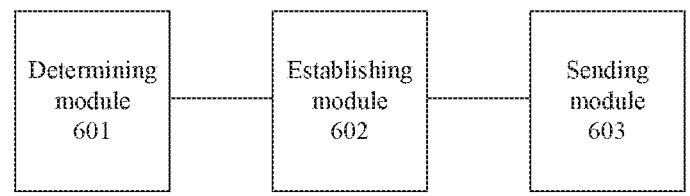
FIG. 6 is a schematic diagram showing functional modules of an apparatus for playing an online television program according to an embodiment of the present disclosure.

With reference to FIG. 6, FIG. 6 is a schematic diagram showing functional modules of an apparatus for playing an online television program according to an embodiment of the present disclosure, which is arranged in a television.

In FIG. 6, the apparatus for playing an online television program includes: a determining module 601, an establishing module 602, and a first sending module 603.

The determining module 601 is configured to obtain a link address of a multimedia resource and determine whether is the apparatus has an online player capable of playing the multimedia resource or not.

The establishing module 602 is configured to: establish a connection with the server based on a determination that the television does not have the online player capable of playing the multimedia resource.

The first sending module 603 is configured to: in a case where the television establishes a connection with the server, send a link of the multimedia resource to the server, such that the server transcodes the multimedia resource according to the link of the multimedia resource.

The apparatus further includes a second sending module.

The second sending module is configured to: after the television establishes a connection with the server, send identification information of the television to the server, where the identification information is used for uniquely identifying the television.

The second sending module is configured to:

send a connection request to the server when the television establishes a connection with the server, where the connection request includes the identification information, such that when the server receives the connection request, the server acquires a performance record of the television in a pre-stored performance database.

An embodiment of the present disclosure provides an apparatus for playing an online television program, which is configured in a server. The server is configured to:

establish a connection with a television; and receive a link of a multimedia resource sent by the television, and transcode the multimedia resource according to the link of the multimedia resource.

Alternatively, the server is further configured to receive identification information of the television after establishing a connection with the television.

the step of receiving identification information of the television by the server includes: when the server receives a connection request sent by the television, obtaining a performance record of the television in a pre-stored performance database; when the server determines that the performance record of the television is already in the performance database, returning a connection success message to the television; and when the server determines that the performance record of the television is not in the performance database, sending a request for obtaining an encoding and decoding performance of the television to the television, storing the obtained encoding and decoding performance in the performance database, and returning the connection success message to the television.

Alternatively, the server is further configured to: query a transcoding buffer pool according to the link of the multimedia resource after receiving the link of the multimedia resource sent by the television, and when the transcoding buffer pool has stored the link of the multimedia resource, send a playing link address corresponding to the link of the multimedia resource to the television.

Alternatively, the server is further configured to:

when the link of the multimedia resource is not stored in the transcoding buffer pool, download and transcode the multimedia resource; and when the server downwards and transcodes the multimedia resource, analyze the link of the multimedia resource, download the multimedia resource, and then perform corresponding processing according to different resource contents.

Alternatively, the server is further configured to:

when the multimedia resource is an audio and video resource, download and decode the multimedia resource by segments as need, and perform encoding according to a multimedia format supported by the television that is read from the performance database;

when the multimedia resource is beyond a format supported by the television, select a preset format;

when the multimedia resource is a picture and has a larger size, scale the size of the picture to a preset size supported by the television; and after the transcoding is completed, store the corresponding result in the transcoding buffer pool and send a playing link address corresponding to the link of the multimedia resource to the television, such that after the television receives the playing link address, the television invokes different players according to different video formats for playing.

Alternatively, the server is further configured to:

receive operation information of a user on the multimedia resource and transcode the resource segment corresponding to the operation information according to the operation information; and send a display effect of an online-edited multimedia resource to the television for previewing or superimpose the display effect and a background picture and send the display effect superimposed with the background picture to the television for previewing.

Embodiments of the present disclosure provide an apparatus for playing an online television program. A television performs information interaction with a server. The television uploads its multimedia decoding performance to the server for the server to transcode multimedia into a preset playing format of the television according to the multimedia decoding performance. The server obtains the multimedia resource, encodes and decodes the multimedia resource, edits and synthesizes a picture, and caches the multimedia resource, so as to realize that the multimedia resource received by the television is fully decoded, ensure that the resource can be normally played by the television, improve the adaptability of the television to the multimedia resource and greatly enhance the experience. More network multimedia resources are supported, so that the television not only can directly play url addresses of individual Internet content providers or network disks, but also can play torrent resources or Magnet links and the like.

An embodiment of the present disclosure provides a non-transitory computer-readable storage medium storing a computer-executable instruction that may execute the television-side method for playing an online television program in any one of the above method embodiments.

An embodiment of the present disclosure provides a non-transitory computer-readable storage medium storing a computer-executable instruction which may execute the server-side method for playing an online television program in any one of the above method embodiments.

Figure 7:
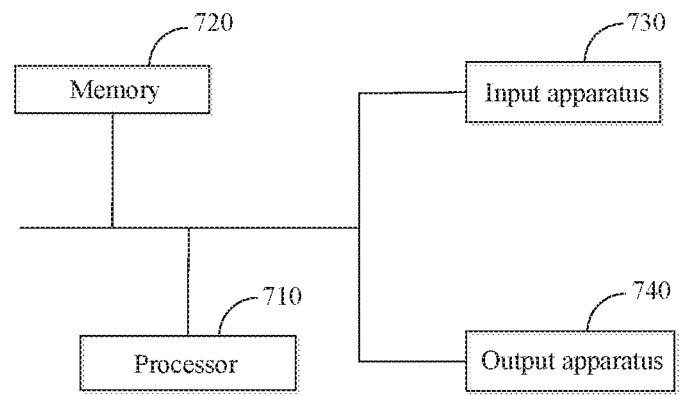
FIG. 7 is a schematic diagram showing a structure of a television according to an embodiment of the present disclosure.

FIG. 7 is a schematic diagram showing a structure of a television according to an embodiment of the present disclosure. As shown in FIG. 7, the television includes: one or more processors 710 and a memory 720

One processor 710 is used in FIG. 7 as an example.

The television may further include an input apparatus 730 and an output apparatus 740.

The processor 710, the memory 720, the input apparatus 730, and the output apparatus 740 may be connected via a bus or other ways. As an example, the processor 710, the memory 720, the input apparatus 730, and the output apparatus 740 are connected via the bus in FIG. 7.

The memory 720, as a non-transitory computer-readable storage medium, may be used for storing non-transitory software programs, non-transitory computer-executable programs and modules, such as corresponding program instructions/modules (for example, the determining module 601, the establishing module 602 and the first sending module 603 as shown in FIG. 6) for performing the television-side method for playing an online television program in the embodiment of the present disclosure. The processor 710 executes various functional applications and data processing of the server by running the non-transitory software programs, the instructions, and the modules stored in the memory 720, thereby implementing the television-side method for playing an online television program.

The memory 720 may include a program storage area and a data storage area. The program storage area may store an operating system, and an application program required by at least one function. The data storage area may store data generated in the interactions of the application program and a user and the like. In addition, the memory 720 may include a high-speed random access memory, and may further include a non-transitory memory, for example, at least one magnetic disk storage device, a flash memory device, or other non-transitory solid state memory devices. In some embodiments, the memory 720 optionally includes memories remotely disposed relative to the processor 710, and these remote memories may be connected to a terminal interacting with the application program over a network.

Examples of the above network include, but are not limited to, Internet, an intranet, a local area network, a mobile communication network, and combinations thereof.

The input apparatus 730 is configured to receive input numerical or character information and generate a key signal input related to user settings and function control of the terminal interacting with the application program. The output apparatus 740 may include a display device such as a display screen.

The one or more modules are stored in the memory 720. When being executed by the one or more processors 710, the one or more modules are stored in the memory 720 perform the television-side method for playing an online television program in any one of the above method embodiments.

Figure 8:
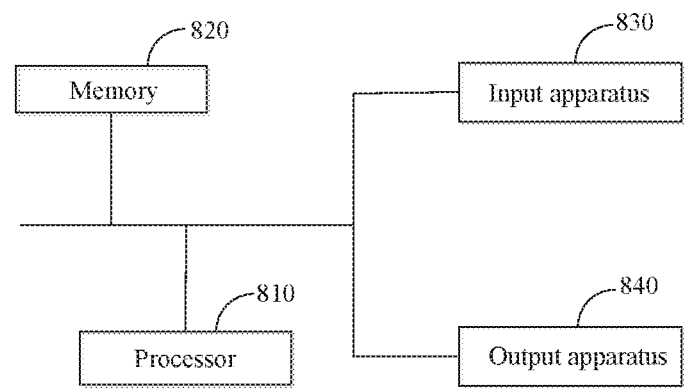
FIG. 8 is a schematic diagram showing a structure of a server according to an embodiment of the present disclosure.

FIG. 8 is a schematic diagram showing a structure of a server according to an embodiment of the present disclosure. As shown in FIG. 8, the server includes: one or more processors 810 and a memory 820.

FIG. 8 exemplarily illustrates one processor 810 as an example.

The server terminal may further include an input apparatus 830 and an output apparatus 840.

The processor 810, the memory 820, the input apparatus 830, and the output apparatus 840 may be connected via a bus or other ways, and an example of connecting via the bus is shown in FIG. 8.

The memory 820, as a non-transitory computer-readable storage medium, may be used for storing non-transitory software programs, non-transitory computer-executable programs and modules, such as program instructions/modules for performing the server-side method for playing an online television program in the embodiment of the present disclosure. The processor 810 executes various functional applications of the server and data processing by running the non-transitory software programs, the instructions, and the modules stored in the memory 820, thereby implementing the server-side method for playing an online television program.

The memory 820 may include a program storage area and a data storage area. The program storage area may store an operating system, and an application program required by at least one function. The data storage area may store data generated in the interactions of the application program and a user, and the like. In addition, the memory 820 may include a high-speed random access memory, and may further include a non-transitory memory, for example, at least one magnetic disk storage device, a flash memory device, or other non-transitory solid state memory devices. In some embodiments, the memory 820 optionally includes memories remotely disposed relative to the processor 810, and these remote memories may be connected to the terminal interacting with the application program over a network.

Examples of the above network may include, but are not limited to, Internet, an intranet, a local area network, a mobile communication network, and combinations thereof.

The input apparatus 830 is configured to receive input numerical or character information and generate a key signal input related to user settings and function control of the terminal interacting with the application program. The output apparatus 840 may include a display device such as a display screen.

The one or more modules are stored in the memory 820 and, when being executed by the one or more processors 810, perform the method for playing an online television program on a server side in any one of the above method embodiments.

The embodiments of the present disclosure are described above in conjunction with specific embodiments. These descriptions are only for explaining the embodiments of the present disclosure, and should not be construed in any way as limiting the protective scope of the embodiments of the present disclosure.

INDUSTRIAL APPLICABILITY

Embodiments of the present disclosure provide a method and an apparatus for playing an online television program. A television performs information interaction with a server. The television uploads its multimedia decoding performance to the server for the server to correspondingly transcode multimedia into a preset playing format of the television. The server obtains a multimedia resource, encodes and decodes the multimedia resource, edits and synthesizes a picture, and caches the multimedia resource, so as to realize that the multimedia resource received by the television is fully decoded, ensure that the resource can be normally played by the television, improve the adaptability of the television to the multimedia resource and greatly enhance the experience. More network multimedia resources are supported, so that the television not only can directly play url addresses of individual Internet content providers or network disks, but also can play torrent resources or Magnet links and the like.

What is claimed is:

1. A method for playing an online television program, comprising:
   a television obtaining a link address of a multimedia resource and determining whether having an online player capable of playing the multimedia resource;
   the television establishing a connection with a server based on a determination that the television does not have the online player capable of playing the multimedia resource; and
   the television sending the link of the multimedia resource to the server, such that the server transcodes the multimedia resource according to the link of the multimedia resource;
   after the television establishing the connection with the server, the method further comprising:
   the television sending identification information of the television to the server, wherein the identification information is configured to uniquely identify the television;
   wherein the television sending identification information of the television to the server comprises:
   the television sending a connection request containing the identification information to the server, such that the server acquires a performance record of the television in a pre-stored performance database when the server receives the connection request; and
   wherein a basic structure of the pre-stored performance database comprises chip and model serial numbers, a supported video format, a supported audio format, and a supported picture format.

2. A method for playing an online television program, comprising:
   establishing, by a server, a connection with a television; and
   receiving, by the server, a link of a multimedia resource sent by the television and transcoding, by the server, the multimedia resource according to the link of the multimedia resource;
   after the server establishing the connection with the television, the method further comprising: receiving identification information of the television by the server,
   wherein the receiving identification information of the television by the server comprises:
   when the server receives a connection request sent by the television, the server acquiring a performance record of the television in a pre-stored performance database;
   when the server determines that the performance database already has the performance record of the television, the server returning a connection success message to the television; and
   when the server determines that the performance database has no performance record of the television, the server sending a request for acquiring a encoding and decoding performance of the television to the television, storing the acquired encoding and decoding performance in the performance database, and returning the connection success message to the television;
   wherein a basic structure of the pre-stored performance database comprises chip and model serial numbers, a supported video format, a supported audio format, and a supported picture format.

3. The method according to claim 2, after the server receiving the link of the multimedia resource sent by the television, the method further comprising:
   querying a transcoding buffer pool by the server according to the link of the multimedia resource, and
   if the transcoding buffer pool has stored the link of the multimedia resource, sending by the server a playing link address corresponding to the link of the multimedia resource to the television.

4. The method according to claim 2, further comprising:
if the transcoding buffer pool has not stored the link of the multimedia resource, downloading and transcoding the multimedia resource by the server; and
when the server downwards and transcodes the multimedia resource, the server analyzing the link of the multimedia resource, downloading the multimedia resource, and transcodes the multimedia resource.

5. The method according to claim 4, wherein the performing corresponding processes according to different resource contents by the server comprises:
when the multimedia resource is an audio and video resource, downloading and decoding the audio and video resource by segments, and encoding by the server according to a multimedia format supported by the television that is read from the performance database;
when the multimedia resource is a picture and has a large size, scaling, by the server, the picture to a preset size supported by the television; and
after the multimedia resource is transcoded, the server storing the transcoded multimedia resource in the transcoding buffer pool and sending a playing link address corresponding to the link of the multimedia resource to the television;
such that after receiving the playing link address, the television plays the transcoded multimedia resource with a player corresponding to a format of the transcoded multimedia resource.

6. The method according to claim 2, further comprising:
the server receiving operation information of a user on the multimedia resource and transcoding a corresponding resource segment according to the operation information; and
the server sending a display effect of an online-edited multimedia resource to the television for previewing or superimposing the display effect with a background picture and then sending the display effect superimposed with the background picture to the television for previewing.

7. The method according to claim 2, further comprising:
the server receiving operation information of a user on the multimedia resource and transcoding a corresponding resource segment according to the operation information; and
the server sending a display effect of an online-edited multimedia resource to the television for previewing or superimposing the display effect with a background picture and then sending the display effect superimposed with the background picture to the television for previewing.

8. The method according to claim 3, further comprising:
the server receiving operation information of a user on the multimedia resource and transcoding a corresponding resource segment according to the operation information; and
the server sending a display effect of an online-edited multimedia resource to the television for previewing or superimposing the display effect with a background picture and then sending the display effect superimposed with the background picture to the television for previewing.

9. The method according to claim 4, further comprising:
the server receiving operation information of a user on the multimedia resource and transcoding a corresponding resource segment according to the operation information; and
the server sending a display effect of an online-edited multimedia resource to the television for previewing or superimposing the display effect with a background picture and then sending the display effect superimposed with the background picture to the television for previewing.

10. The method according to claim 5, further comprising:
the server receiving operation information of a user on the multimedia resource and transcoding a corresponding resource segment according to the operation information; and
the server sending a display effect of an online-edited multimedia resource to the television for previewing or superimposing the display effect with a background picture and then sending the display effect superimposed with the background picture to the television for previewing.

11. An apparatus for playing an online television program, configured at a television, the apparatus comprises a processer and a computer storage medium for storing a processor-executable instructions, wherein the processor is configured to execute the processor-executable instructions to perform a method for playing the online television program, and the method comprises:
obtaining a link address of a multimedia resource and determining whether having an online player capable of playing the multimedia resource;
establishing a connection with a server based on a determination that the television does not have the online player capable of playing the multimedia resource; and
sending the link of the multimedia resource to the server, such that the server transcodes the multimedia resource according to the link of the multimedia resource;
after establishing the connection with the server, the method further comprising:
sending identification information of the television to the server, wherein the identification information is configured to uniquely identify the television;
wherein the sending identification information of the television to the server comprises:
sending a connection request containing the identification information to the server, such that the server acquires a performance record of the television in a pre-stored performance database when the server receives the connection request; and
wherein a basic structure of the pre-stored performance database comprises chip and model serial numbers, a supported video format, a supported audio format, and a supported picture format.

* * * * *